US007422542B2

(12) United States Patent
Freitag et al.

(10) Patent No.: US 7,422,542 B2
(45) Date of Patent: Sep. 9, 2008

(54) METHOD OF MONITORING A CHAIN PULLEY BLOCK AND CHAIN PULLEY BLOCK APPARATUS

(75) Inventors: Holger Freitag, Bochum (DE); Oliver Moll, Solingen (DE); Erik Appel, Wetter (DE); Ralf Eising, Herne (DE); Udo Gersemsky, Herdecke (DE); Burkhard Hasenack, Hagen (DE); Anton Münzebrock, Dortmund (DE); Giuliano Persico, Wetter (DE)

(73) Assignee: Demag Cranes & Components GmbH, Wetter (DE)

( * ) Notice: Subject to any disclaimer, the term of this patent is extended or adjusted under 35 U.S.C. 154(b) by 655 days.

(21) Appl. No.: 10/925,310

(22) Filed: Aug. 24, 2004

(65) Prior Publication Data

US 2005/0065692 A1 Mar. 24, 2005

(30) Foreign Application Priority Data

Aug. 25, 2003 (DE) ................................ 103 39 440

(51) Int. Cl.
*B60W 10/18* (2006.01)
*H02P 3/04* (2006.01)

(52) U.S. Cl. ............................ 477/23; 477/21; 477/29; 477/173; 477/178; 192/147; 192/226; 254/267

(58) Field of Classification Search ....................... None
See application file for complete search history.

(56) References Cited

U.S. PATENT DOCUMENTS 2,605,313 A * 7/1952 Sadler ......................... 310/96
4,175,727 A * 11/1979 Clarke ......................... 254/274
4,493,398 A * 1/1985 Kindler ......................... 187/296
4,493,479 A * 1/1985 Clark ......................... 254/274
4,636,962 A * 1/1987 Broyden et al. ............. 700/228
5,693,919 A * 12/1997 Sager et al. ................. 187/282
6,966,545 B2 * 11/2005 Eising et al. ................ 254/358
7,063,306 B2 * 6/2006 Sanders et al. .............. 254/361
2005/0098768 A1 * 5/2005 Malek et al. ................ 254/267

FOREIGN PATENT DOCUMENTS

DE 1556374 A 4/1970
DE 3838058 A1 5/1990
DE 19927847 C1 10/2000
EP 0476459 A2 3/1992

* cited by examiner

*Primary Examiner*—David D. Le
(74) *Attorney, Agent, or Firm*—Van Dyke, Gardner, Linn & Burkhart, LLP

(57) ABSTRACT

A method for monitoring a chain pulley block and a chain pulley block apparatus with an electric actuator motor (2) that is connected at the drive side to a transmission (7) across a sliding clutch (14). In order to achieve a safe operation of the chain pulley block, the speed of the transmission (7) is determined via a sensor (18), the determined speed of the transmission (7) is compared in a control device (19) to the operating speed of the actuator motor (2) as determined from rated duty of the actuator motor (2) and if a deviation is found between the speed of the transmission (7) and the operating speed, allowing for tolerances and any transmission ratio of the transmission (7), the actuator motor (2) is switched off.

18 Claims, 1 Drawing Sheet

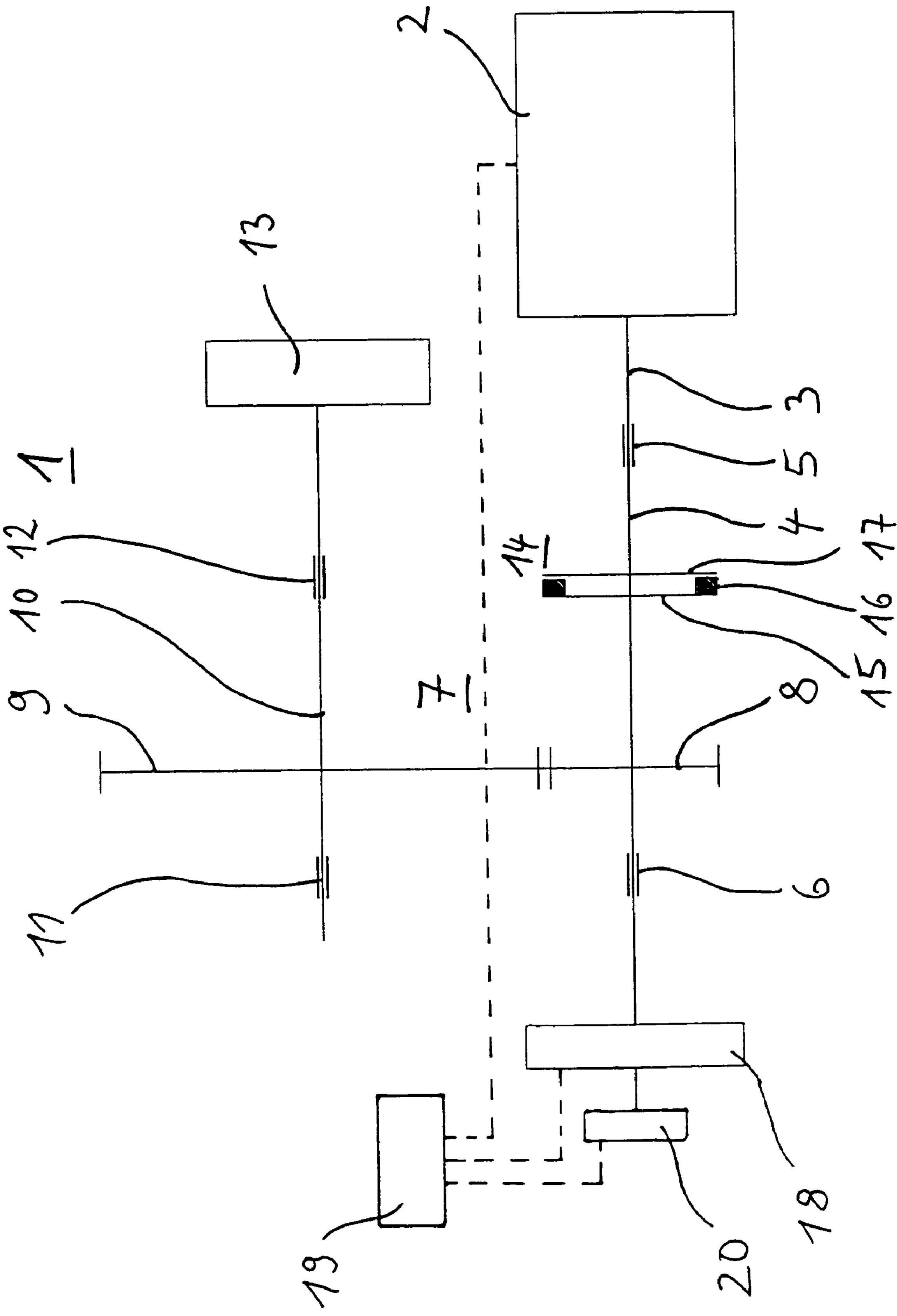
1
2
3
4
5
6
7
8
9
10
11
12
13
14
15
16
17
18
19
20

METHOD OF MONITORING A CHAIN PULLEY BLOCK AND CHAIN PULLEY BLOCK APPARATUS

BACKGROUND OF THE INVENTION

The invention concerns a method for monitoring a chain pulley block with an electric actuator motor, which is connected at the drive side to a transmission across a sliding clutch. The invention also concerns a chain pulley block with an electric actuator motor that is connected at the drive side to a transmission across a sliding clutch.

From German Patent DE 199 27 847 C1 there is known a chain pulley block with an electric actuator motor, whose motor shaft is connected to a secondary transmission. The motor shaft is connected across a sliding clutch to an input shaft of the transmission. At the end of the transmission input shaft opposite the actuator motor there is arranged an electromagnetically activated disk brake.

Also, chain pulley blocks are generally familiar that have their brake arranged on the driven shaft of the actuator motor and thus before the sliding clutch.

In such chain pulley blocks, an overloading of the chain pulley block, a defective end switch, or a failure to release the brake due to a malfunction can not only result in an undesirable slippage of the sliding clutch, but also to thermal overload thereof. Depending on the design of the chain pulley block, this can lead to intense wear or disruption of the sliding clutch, or even a dropping of the load.

Furthermore, there is known from German Patent Application DE 38 38 058 A1 a device for monitoring a drive chain for interruption in the flow of force. The drive chain here has a positive force transmission between an electric motor and a load attachment point in the form of a cable drum of a cable pulley block. The cable drum is teamed up with an accessory brake, which is activated upon detecting a deviation in rotational speed between a first speed sensor assigned to the electric motor and a second speed sensor assigned to the cable drum. Thus, the accessory brake can prevent a load from being dropped.

This monitoring device does not provide for switching off the electric motor when the frictional connection is interrupted, since, when the flow of force is interrupted, it simply runs idle with no load. Here as well, the monitoring takes place by evaluating two speed signals from two speed sensors. This monitoring device does not identify a deviation in the speed of the electric motor from its rated duty in the sense of excessive or inadequate speed.

SUMMARY OF THE INVENTION

The present invention provides a method for monitoring a chain pulley block and a simple design for a chain pulley block with a sliding clutch, enabling a safe operation of the chain pulley block.

According to an aspect of the invention, in a method for monitoring a chain pulley block with an electric actuator motor, connected to a transmission at the drive side across a sliding clutch, a safe operation of the chain pulley block is achieved in that the rotary speed of the transmission is determined via a sensor, the rotary speed of the transmission so determined is compared in a control device with the rated speed of the actuator motor as determined from the rated duty of the actuator motor, and when a deviation is detected between the speed of the transmission and the rated speed, allowing for tolerances and any transmission ratio of the transmission, the actuator motor is switched off.

In this way, it is especially easy to avoid a thermal overloading of the sliding clutch. One can also minimize the wear on the sliding clutch. Furthermore, an overloading of the chain pulley block can be recognized very quickly with the invented sensor at a response time under one second.

The disclosed embodiment of the invention only uses a single speed sensor, since its measured value is compared with a previously determined rated speed kept in the control device for the monitoring process, being characteristic of the particular actual operating condition. The deviations detected via the monitoring can be a rotary speed too high or too low in relation to the memorized rated speed, normally resulting from malfunction of the actuator motor, the sliding clutch, the transmission, or the brake. Thus, all these components of the chain pulley block can be monitored via a single speed sensor in combination with the rated speed kept in the control device.

At the same time as the actuator motor is switched off, there also occurs a braking activation of a brake connected to the transmission at the drive side, so that one safely avoids not only an overloading of the sliding clutch by the actuator motor continuing to run, but also a dropping of a load connected via a chain and a chain wheel to the transmission output shaft.

The comparing of the speed of the transmission to the rated speed determined from the rated duty of the actuator motor becomes especially simple when the sensor determines the speed of the transmission input shaft adjacent to the sliding clutch. Since the sensor is arranged on the transmission input shaft, this sensor can both monitor the sliding clutch and recognize malfunctions in a brake arranged on the transmission input shaft and thereby prevent the brake from becoming overheated.

It becomes especially easy to adapt the monitoring method of the invention to the particular current operating conditions of the chain pulley block when the rated speed of the actuator motor, preferably empirically determined from the rated duty of the actuator motor, is already adapted to different operating conditions of the chain pulley block and kept or saved in the control device.

Furthermore, the control device can already factor in a change from one to another rated speed during the operation of the chain pulley block, especially when switching between individual operating conditions. For this, the control device can be programmed or adjusted in respect of the period of time required for a switch between the particular operating conditions, and the permissible operating speed to be reached within the assigned time period. For example, if the usual period of time is exceeded for accelerating the chain pulley block from slow lifting speed to fast lifting speed, the actuator motor is switched off and the brake may be activated. These time periods can also factor in tolerances, so as not to disturb the operation of the chain pulley block.

The comparison required for the monitoring is further simplified if the rated speeds kept or memorized in the control device are present in the form of rated speed ranges and thus already contain in addition the information about the permissible tolerance range in regard to the rated speed for the particular operating condition. The same holds for the periods of time.

In relation to the chain pulley block with an electric actuator motor, which is connected at the drive side to a transmission across a sliding clutch, a safe operation of the chain pulley block is achieved according to the invention in that a sensor is provided to detect the speed of the transmission, which is connected to a control device, the control device is connected to the actuator motor, and the rotary speeds determined via the control device from the measured values of the sensor and the measured values or rated duty of the actuator motor can be compared, and a determination of a deviation between the speed of the transmission and the speed of the motor, allowing for tolerances and any transmission ratio of the transmission, results in a switching off of the actuator motor.

At the same time as the switching off of the actuator motor, there occurs a braking activation of a brake connected at the drive side to the transmission, so that one safely avoids an overloading of the sliding clutch if the actuator motor were to continue running and also a dropping of the load connected to the transmission output shaft via a chain and a pocket wheel.

A simplification of the comparing of the speed of the transmission to the motor speed as determined from the rated duty or measured values of the actuator motor is accomplished in that the sensor for determining the speed of the transmission input shaft is arranged on the transmission input shaft adjacent to the sliding clutch.

In one design configuration, the sensor is configured as a fan type lock washer formed torsion-free on the transmission input shaft, the rotary speed of which is determined by a light barrier.

BRIEF DESCRIPTION OF THE DRAWING

A sample embodiment of the invention shall be explained more closely by means of a single figure. This figure shows in schematic representation the essential drive components of a chain pulley block, according to the invention.

DESCRIPTION OF THE PREFERRED EMBODIMENT

Referring now to the drawing and the illustrative embodiments depicted therein, a chain pulley block 1 has an electric actuator motor 2 with a motor shaft 3 projecting at the drive side of the actuator motor 2. The motor shaft 3 is arranged coaxially to a transmission input shaft 4 and connected torsion-free to it. The transmission input shaft 4 is mounted in the area of its ends by a first bearing 5 and a second bearing 6, which may be configured as roller bearings. The transmission input shaft 4 is part of a transmission 7, which in the present sample embodiment is a single stage type, but it could also be multiple stage. The transmission 7 essentially consists of the transmission input shaft 4, between whose bearings 5 and 6 a first gear 8 is arranged, meshing with a second gear 9. This second gear 9 of the single transmission stage of the transmission 7 is arranged torsion-free on a transmission output shaft 10, which is mounted on either side of the second gear 9 by a third bearing 11 and a fourth bearing 12, preferably configured as roller bearings. The transmission input shaft 4 and the transmission output shaft 10 are arranged here parallel and at a distance from each other. At one end of the transmission output shaft 10 is arranged a chain wheel 13 torsion-free. This chain wheel 13 in a conventional manner serves for the frictional driving of the chain (not shown) of the chain pulley block 1, which, after performing the lifting process of the chain pulley block 1, passes from the chain wheel 13 into a chain magazine (not shown).

Furthermore, it is evident from the single figure that a sliding clutch 14 is arranged as overload protection in the path of the transmission input shaft 4 and preferably in the direction of the first gear 8 as viewed behind the first bearing 5. The sliding clutch 14 essentially consists of a clutch disk 15 with a ring-shaped clutch liner 16, a pressing disk 17, and a spring element (not shown) to produce a tension between pressing disk 17 and clutch disk 15. The pressing disk 17 and clutch disk 15 are each arranged torsion-free on the transmission input shaft 4, which is interrupted in the region of the sliding clutch 14. In order to place the sliding clutch 14 under a tension determining the maximum supported torque, the not represented spring element is provided, preferably consisting of spring disks lying against each other and arranged on the transmission input shaft. The pack of spring elements is supported on one side against the transmission input shaft 4 and on the other side against the first bearing 5.

A sensor 18 is provided for determining the speed of the transmission input shaft 4. In the illustrative embodiment, sensor 18 is at the end opposite the actuator motor 2 and thus behind the sliding clutch 14 looking from the actuator motor 2. The sensor 18 may be configured as a fan type lock washer (not shown), arranged with the transmission input shaft 4 revolving at its end. In the region of the fan of the lock washer, there is arranged a light barrier, whose frequency of interruption of the light is used to determine the speed of the transmission input shaft 4 in a control device 19 connected to the sensor 18.

Furthermore, a brake, such as an electromagnetically activated brake 20, is arranged on the transmission input shaft 4, which can be actuated via the control device 19.

Furthermore, in this control device 19 there are stored or deposited ranges of operating speeds of the actuator motor 2 that are established in conventional manner for the many different operating conditions. In this connection, by operating condition is meant, for example, standstill, lowering at high speed, lowering at low speed, lifting at high speed, lifting at low speed, switching between high and low speed in lifting or lowering mode, and lifting or lowering from standstill at high or low speed until reaching the high or low speed. The particular operating condition to be used depends on the position of the operator switch for the actuator motor 2. The ranges of operating speeds to be adjusted for the actuator motor 2 can be empirically determined for the conventionally used types of motors and mains frequencies. A computation is also possible. The control device 19 can be adjusted or programmed with regard to the time period required for a switch between operating conditions and the permissible ranges of operating speed to be achieved each time within the particular time period. Thus, the control device 19 can be optimally adjusted to the different operating conditions. Thus, for example, a period of several hundred milliseconds (e.g., 700 ms) can be specified for the slow lifting motion before there occurs a switching off of brake 20 and actuator motor 2, in order to enable a checking and an adjustment of the sliding clutch 14. The time periods and ranges of operating speed will be chosen so that neither actuator motor 2 nor brake 20 nor sliding clutch 14 is overloaded and no impermissible movement of the load can occur.

By employing a detection of direction of turning, which is possible for the sensor 18, the monitoring of the chain pulley block 1 can also be dependent on the direction of turning, i.e., in the lifting or lowering direction. Since the control device 19 receives the control signal for the desired direction of movement of the load (lifting or lowering) via the operator device (not shown) for the chain pulley block 1, one can further monitor the consistency between desired direction of movement and actual direction of movement.

If, now, a slippage or failure of the sliding clutch 14 should occur, this will be instantly recognized via the control device 19 by comparing the speed of the transmission input shaft 4 to the operating speed range for the particular operating condition kept in the control device 19 for the particular actuator motor 2 and the deviation which now exists, and the control device 19 will instantly switch off the actuator motor 2 and at the same time activate the brake 20 for the braking process. Thus, one can successfully avoid a dropping of the load. If the slippage of the sliding clutch 14 is caused by a non-released brake 20, the instant switching off of the actuator motor 2 can also prevent an overheating of the brake 20. In the present sample embodiment, the brake 20 is arranged at the end of the transmission input shaft 4 away from the actuator motor 2 and thus behind the sliding clutch 14, looking from the actuator motor 2.

In order to switch off the actuator motor 2 when necessary and allow the brake 20 to respond, the control device 19 may be appropriately connected to the actuator motor 2 and the brake 20.

Changes and modifications in the specifically described embodiments can be carried out without departing from the principles of the invention which is intended to be limited only by the scope of the appended claims, as interpreted according to the principles of patent law including the doctrine of equivalents.

The embodiments of the invention in which an exclusive property or privilege is claimed are defined as follows:

1. A method for monitoring a chain pulley block comprising:

providing an electric actuator motor that is connected to an input shaft of a transmission through a sliding clutch;

determining a speed of said input shaft of the transmission with a sensor arranged on said input shaft;

providing a control device and comparing with said control device the speed of the transmission measured by said sensor against an operating speed of the actuator motor wherein the operating speed of the actuator motor being determined from an operating condition of the actuator motor;

switching off the actuator motor if a deviation is found between the speed of the transmission and the operating speed of the actuator motor; and providing a brake connected to the transmission and activating said brake at the same time as the switching off of the actuator motor.

2. The method of claim 1, wherein the deviation allows for at least one chosen from i) tolerances in the amount of deviation required for the switching off of the actuator motor and ii) any transmission ratio of the transmission.

3. The method of claim 1, wherein said sensor is configured as a fan type lock washer on the transmission input shaft, the speed of the transmission input shaft being determined by a light barrier, wherein light from said light barrier is interrupted by said lock washer.

4. The method of claim 1, wherein at least one permissible operating speed of the actuator motor is stored in the control device for each of the different operating conditions of the chain pulley block.

5. The method of claim 4, wherein a plurality of the permissible operating speeds are stored in said control device in the form of operating speed ranges.

6. The method of claim 4, wherein said control device is programmable with a period of time required for switching between a first permissible operating speed and a second permissible operating speed, wherein said control device is operable to switch said actuator motor from the first permissible operating speed to the second permissible operating speed within said period of time.

7. The method of claim 6, wherein a plurality of the permissible operating speeds are stored in said control device in the form of operating speed ranges.

8. The method of claim 1, wherein said sliding clutch provides overload protection for said input shaft of said transmission.

9. The method of claim 8, wherein said sliding clutch comprises a clutch disk and a pressing disk, said pressing disk biased against said clutch disk.

10. A chain pulley block, comprising:

an electric actuator motor being connected to an input shaft of a transmission through a sliding clutch;

a sensor arranged on the transmission input shaft, said sensor detecting a speed of the transmission;

a control device responsive to said sensor, said control device being connected to the actuator motor;

said control device comparing the speed of the transmission measured by said sensor against an operating speed of the actuator motor, wherein the operating speed of the actuator motor is determined from an operating condition of the actuator motor;

said control device switching off the actuator motor upon detection of a deviation between the speed of the transmission and the operating speed of the actuator motor; and a brake connected to the transmission, wherein said brake is activated at the same time as the switching off of the actuator motor.

11. The chain pulley block of claim 10, wherein said sensor is configured as a fan type lock washer on free on the transmission input shaft, the speed of the transmission input shaft being determined by a light barrier, wherein light from said light barrier is interrupted by said lock washer.

12. The chain pulley block of claim 10, wherein the deviation allows for at least one chosen from i) tolerances in the amount of deviation required for the switching off of the actuator motor and ii) any transmission ratio of the transmission.

13. The chain pulley block of claim 10, wherein said sliding clutch provides overload protection for said input shaft of said transmission.

14. The chain pulley block of claim 13, wherein said sliding clutch comprises a clutch disk and a pressing disk, said pressing disk biased against said clutch disk.

15. The chain pulley block of claim 10, wherein at least one permissible operating speed of the actuator motor is stored in the control device for each of the different operating conditions of the chain pulley block.

16. The chain pulley block of claim 15, wherein a plurality of the permissible operating speeds are stored in said control device in the form of operating speed ranges.

17. The chain pulley block of claim 15, wherein said control device is programmable with a period of time required for switching between a first permissible operating speed and a second permissible operating speed, wherein said control device is operable to switch said actuator motor from said first permissible operating speed to said second permissible operating speed within said period of time.

18. The chain pulley block of claim 17, wherein a plurality of the permissible operating speeds are stored in said control device in the form of operating speed ranges.

* * * * *

UNITED STATES PATENT AND TRADEMARK OFFICE

CERTIFICATE OF CORRECTION

PATENT NO. : 7,422,542 B2
APPLICATION NO. : 10/925310
DATED : September 9, 2008
INVENTOR(S) : Holger Freitag et al.

It is certified that error appears in the above-identified patent and that said Letters Patent is hereby corrected as shown below:

Column 6:
Line 30, Claim 11, Delete --free on-- after "washer on".

Signed and Sealed this

Twenty-seventh Day of January, 2009

JOHN DOLL
*Acting Director of the United States Patent and Trademark Office*